(12) United States Patent
Youngs, Jr.

(10) Patent No.: US 6,402,049 B1
(45) Date of Patent: Jun. 11, 2002

(54) SPRINKLER TIMER SYSTEM

(76) Inventor: Jack V. Youngs, Jr., 7980 Gladiola Cir., Buena Park, CA (US) 90620

( * ) Notice: Subject to any disclaimer, the term of this patent is extended or adjusted under 35 U.S.C. 154(b) by 33 days.

(21) Appl. No.: 09/621,477

(22) Filed: Jul. 21, 2000

(51) Int. Cl.[7] .............................................. A01G 27/00
(52) U.S. Cl. ............................. 239/70; 239/69; 239/71; 364/145
(58) Field of Search ................................ 239/70, 67–69, 239/71, 74; 364/140–147

(56) References Cited

U.S. PATENT DOCUMENTS

| | | |
|---|---|---|
| 4,165,532 A | 8/1979 | Kendall et al. |
| 4,396,149 A * | 8/1983 | Hirsch .......................... 239/69 |
| 4,626,984 A | 12/1986 | Unruh et al. |
| 5,025,361 A | 6/1991 | Pitman et al. |
| 5,262,936 A * | 11/1993 | Faris et al. .................... 239/70 |
| 5,381,331 A | 1/1995 | Mock et al. |
| 5,444,611 A | 8/1995 | Woytowitz et al. |
| 5,479,338 A | 12/1995 | Ericksen et al. |
| 5,568,376 A * | 10/1996 | Benmergui et al. ........... 239/69 |
| 5,748,466 A * | 5/1998 | McGivern et al. ............ 239/70 |
| 5,956,248 A * | 9/1999 | Williams et al. .............. 239/70 |

* cited by examiner

*Primary Examiner*—William C. Doerrler
*Assistant Examiner*—Dinh Q. Nguyen

(57) ABSTRACT

A sprinkler timer system for effectively controlling the timed operation of a water sprinkler system. The sprinkler timer system includes a housing having a back wall, side walls, and an open front side with the housing being adapted to be mounted to a wall structure; and also includes a cover being hingedly attached to the housing and being securely closeable over the open front side of the housing; and further includes a panel disposed in the housing and having a front side; and also includes a plurality of independent water sprinkler circuits disposed in the housing with each of said water sprinkler circuits being adapted to control and operate a separate water sprinkler system; and further includes a terminal strip having a plurality of terminals securely disposed upon the terminal strip with the terminal strip being securely mounted to the panel; and also includes a meter securely mounted within the housing for displaying usage of the water sprinkler timer system; and a controlling and energizing assembly for controlling and energizing the water sprinkler circuits.

16 Claims, 7 Drawing Sheets

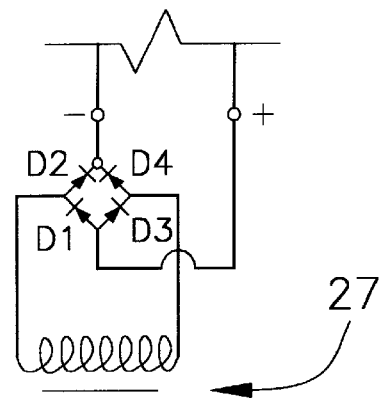
Fig.3
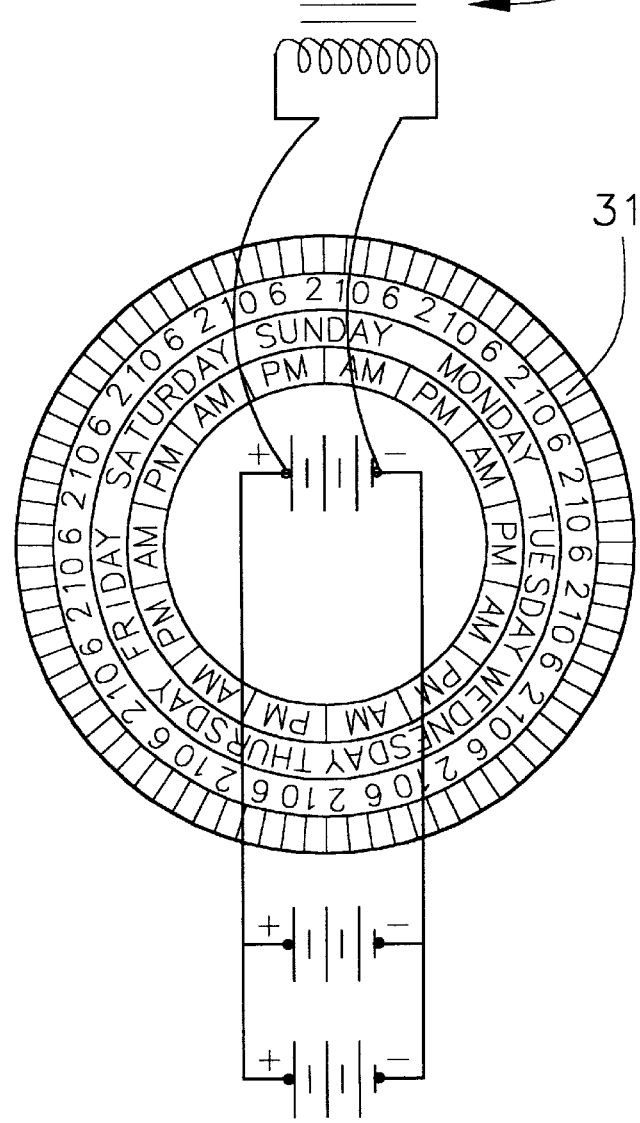
Fig.4   110 Volts Input

SPRINKLER TIMER SYSTEM

BACKGROUND OF THE INVENTION

1. Field of the Invention

The present invention relates to a water sprinkler timer and more particularly pertains to a new sprinkler timer system for effectively controlling the timed operation of a water sprinkler system.

2. Description of the Prior Art

The use of a water sprinkler timer is known in the prior art. More specifically, a water sprinkler timer heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,381,331; U.S. Pat. No. 4,165,532; U.S. Pat. No. 5,479,338; U.S. Pat. No. 5,444,611; U.S. Pat. No. 5,025,361; and U.S. Pat. No. 4,626,984.

While these devices fulfill their respective, particular objectives and requirements, the aforementioned patents do not disclose a new sprinkler timer system. The inventive device includes a housing having a back wall, side walls, and an open front side with the housing being adapted to be mounted to a wall structure; and also includes a cover being hingedly attached to the housing and being securely closeable over the open front side of the housing; and further includes a panel disposed in the housing and having a front side; and also includes a plurality of independent water sprinkler circuits disposed in the housing with each of said water sprinkler circuits being adapted to control and operate a separate water sprinkler system; and further includes a terminal strip having a plurality of terminals securely disposed upon the terminal strip with the terminal strip being securely mounted to the panel; and also includes a meter securely mounted within the housing for displaying usage of the water sprinkler timer system; and a controlling and energizing assembly for controlling and energizing the water sprinkler circuits.

In these respects, the sprinkler timer system according to the present invention substantially departs from the conventional concepts and designs of the prior art, and in so doing provides an apparatus primarily developed for the purpose of effectively controlling the timed operation of a water sprinkler system.

SUMMARY OF THE INVENTION

In view of the foregoing disadvantages inherent in the known types of water sprinkler timer now present in the prior art, the present invention provides a new sprinkler timer system construction wherein the same can be utilized for effectively controlling the timed operation of a water sprinkler system.

The general purpose of the present invention, which will be described subsequently in greater detail, is to provide a new sprinkler timer system which has many of the advantages of the water sprinkler timer mentioned heretofore and many novel features that result in a new sprinkler timer system which is not anticipated, rendered obvious, suggested, or even implied by any of the prior art water sprinkler timer, either alone or in any combination thereof.

To attain this, the present invention generally comprises a housing having a back wall, side walls, and an open front side with the housing being adapted to be mounted to a wall structure; and also includes a cover being hingedly attached to the housing and being securely closeable over the open front side of the housing; and further includes a panel disposed in the housing and having a front side; and also includes a plurality of independent water sprinkler circuits disposed in the housing with each of said water sprinkler circuits being adapted to control and operate a separate water sprinkler system; and further includes a terminal strip having a plurality of terminals securely disposed upon the terminal strip with the terminal strip being securely mounted to the panel; and also includes a meter securely mounted within the housing for displaying usage of the water sprinkler timer system; and a controlling and energizing assembly for controlling and energizing the water sprinkler circuits.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new sprinkler timer system which has many of the advantages of the water sprinkler timer mentioned heretofore and many novel features that result in a new sprinkler timer system which is not anticipated, rendered obvious, suggested, or even implied by any of the prior art water sprinkler timer, either alone or in any combination thereof.

It is another object of the present invention to provide a new sprinkler timer system which may be easily and efficiently manufactured and marketed.

It is a further object of the present invention to provide a new sprinkler timer system which is of a durable and reliable construction.

An even further object of the present invention is to provide a new sprinkler timer system which is susceptible of a low cost of manufacture with regard to both materials and labor, and which accordingly is then susceptible of low prices of sale to the consuming public, thereby making such sprinkler timer system economically available to the buying public.

Still yet another object of the present invention is to provide a new sprinkler timer system which provides in the apparatuses and methods of the prior art some of the advantages thereof, while simultaneously overcoming some of the disadvantages normally associated therewith.

Still another object of the present invention is to provide a new sprinkler timer system for effectively controlling the timed operation of a water sprinkler system.

Yet another object of the present invention is to provide a new sprinkler timer system which includes a housing having a back wall, side walls, and an open front side with the housing being adapted to be mounted to a wall structure; and also includes a cover being hingedly attached to the housing and being securely closeable over the open front side of the housing; and further includes a panel disposed in the housing and having a front side; and also includes a plurality of independent water sprinkler circuits disposed in the housing with each of said water sprinkler circuits being adapted to control and operate a separate water sprinkler system; and further includes a terminal strip having a plurality of terminals securely disposed upon the terminal strip with the terminal strip being securely mounted to the panel; and also includes a meter securely mounted within the housing for displaying usage of the water sprinkler timer system; and a controlling and energizing assembly for controlling and energizing the water sprinkler circuits.

Still yet another object of the present invention is to provide a new sprinkler timer system that uses analog controls rather than digital controls as found in the prior art.

Even still another object of the present invention is to provide a new sprinkler timer system that is easy to understand and convenient to operate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a flow diagram FIGS. 1 & 2 of the present invention.

FIG. 4 is schematic view of the clock unit and dial of the present invention.

DESCRIPTION OF THE PREFERRED EMBODIMENT

Figure 1:
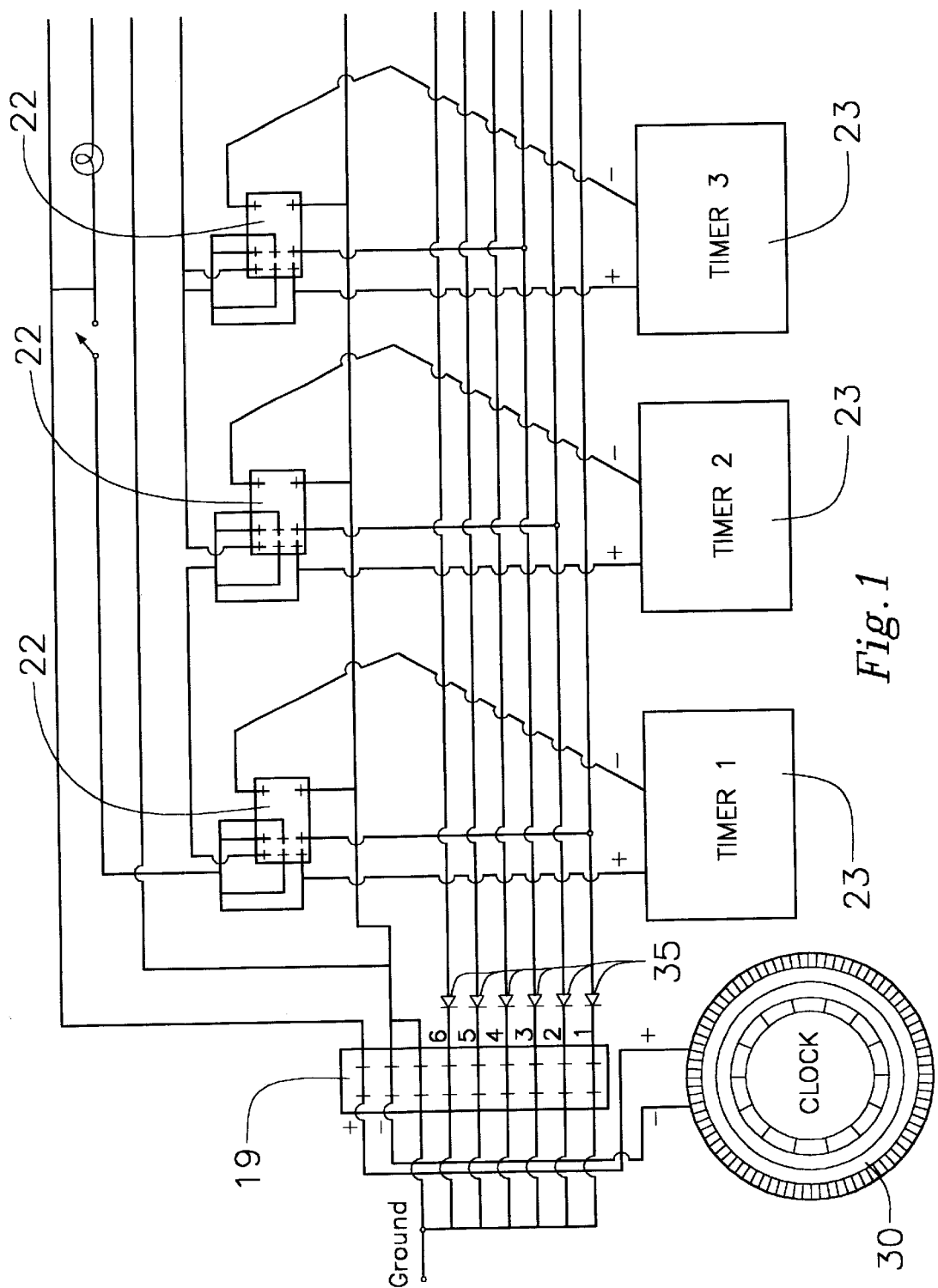
FIG. 1 is a partial schematic diagram of a new sprinkler timer system according to the present invention.
Figure 2:
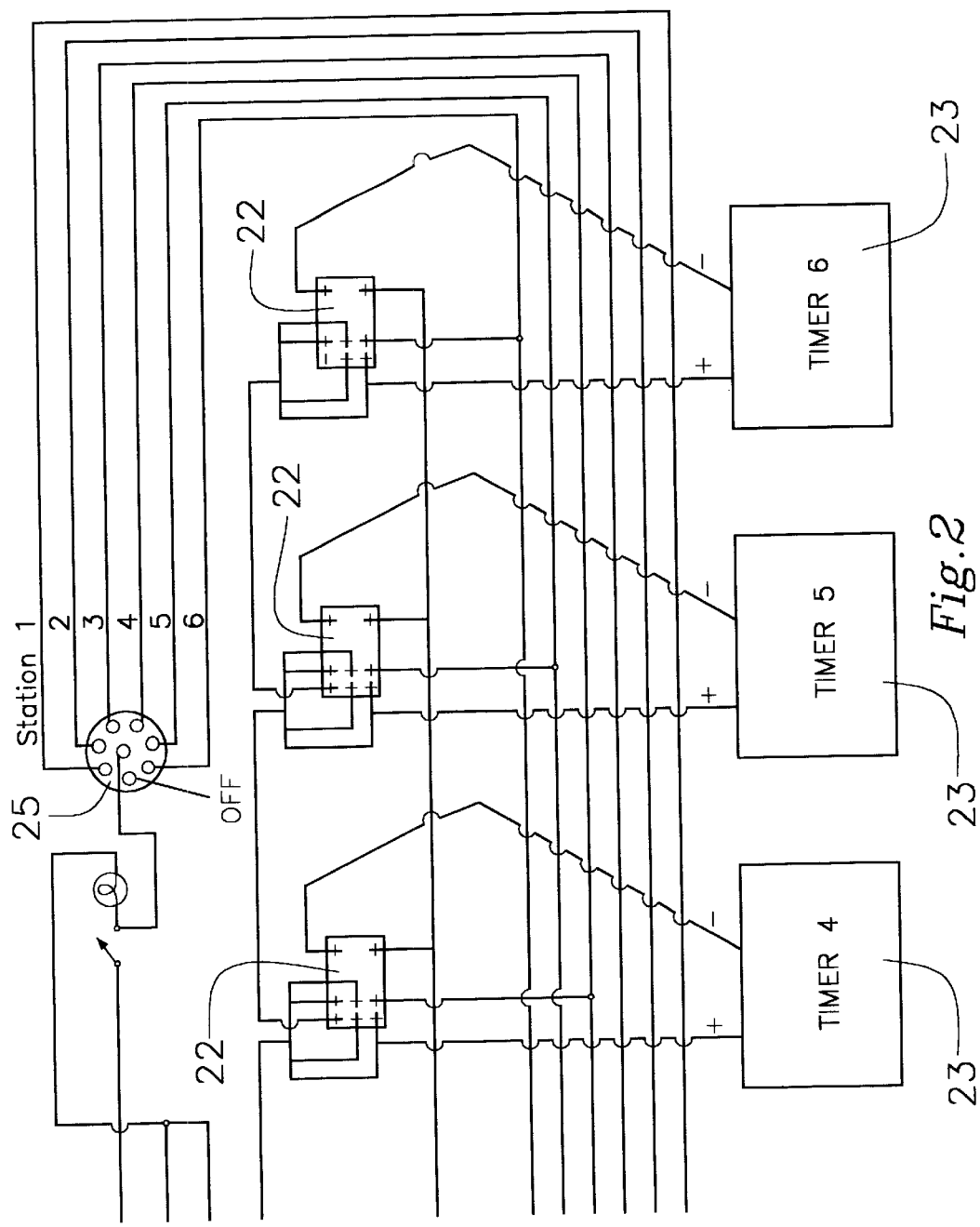
FIG. 2 is another partial schematic diagram of the present invention.
Figure 5:
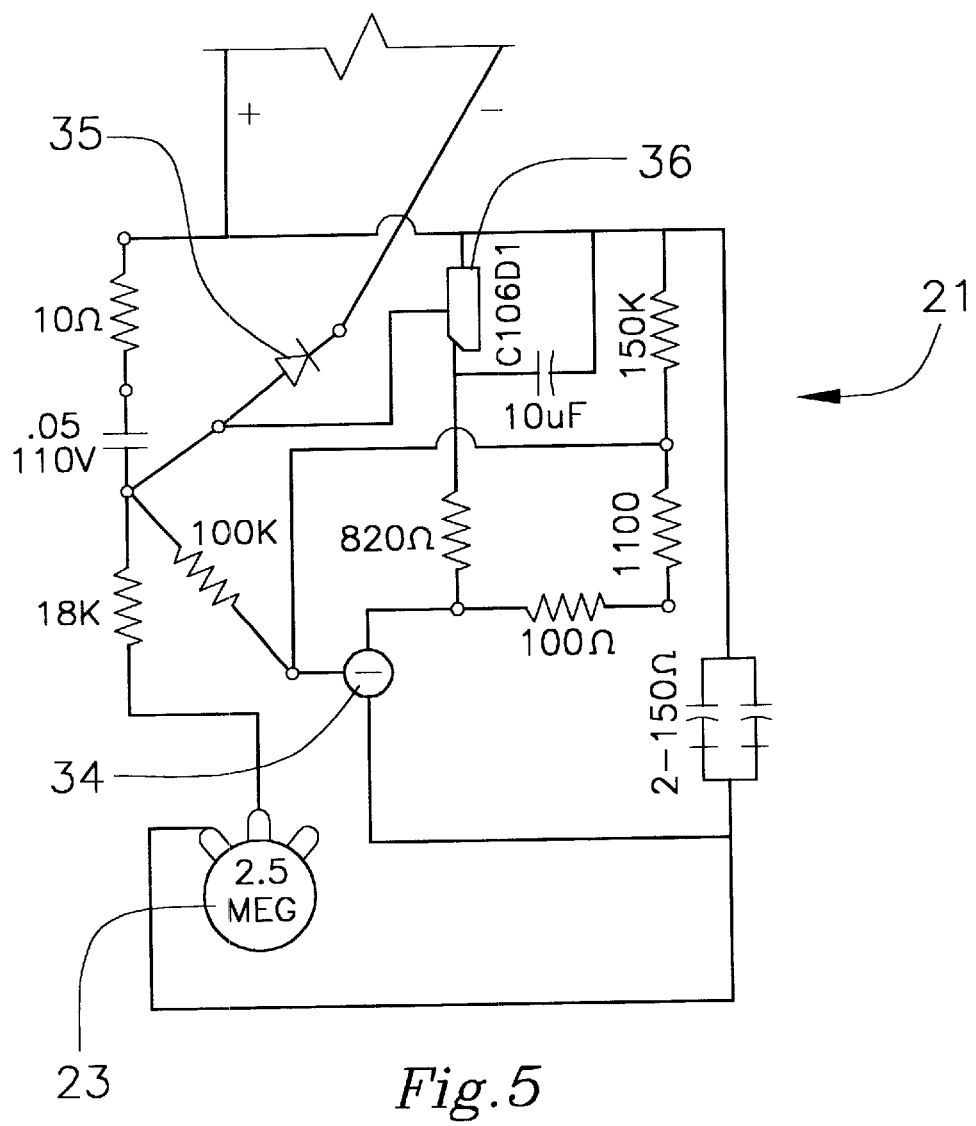
FIG. 5 is a schematic diagram of one of the water sprinkler circuits of the present invention.
Figure 6:
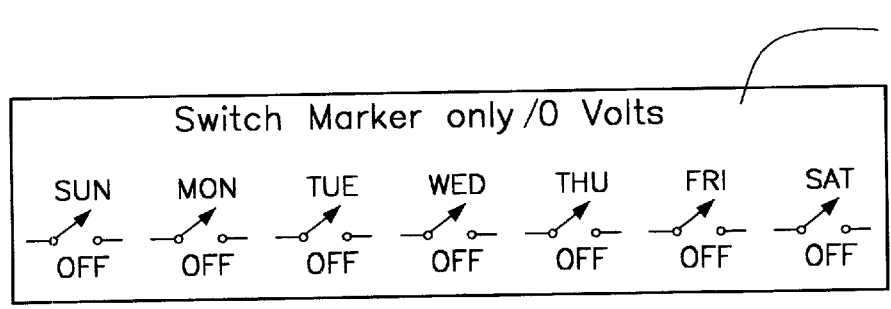
FIG. 6 is a schematic diagram of the control on/off switch box of the present invention.
Figure 7:
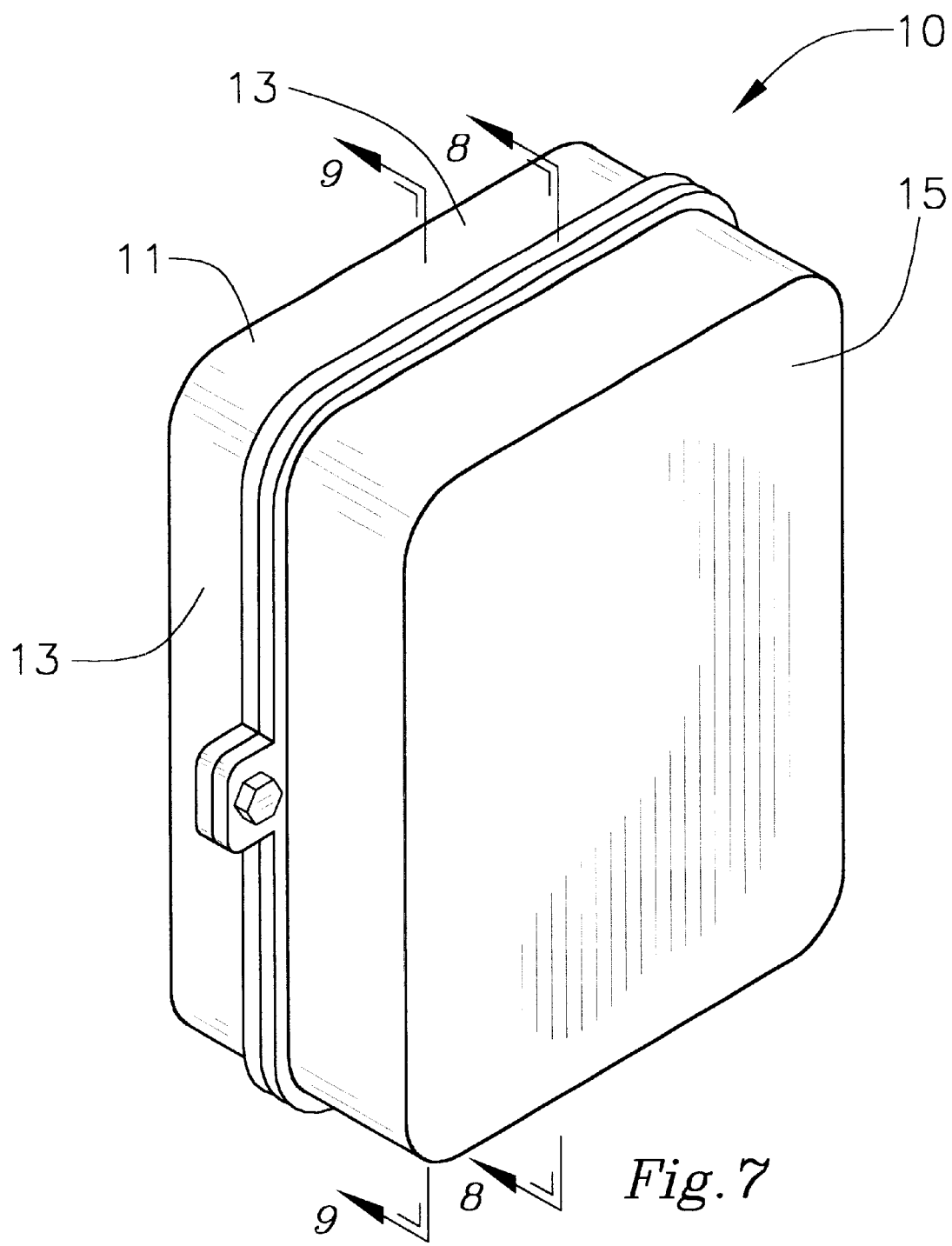
FIG. 7 is a perspective view of the housing of the present invention.
Figure 8:
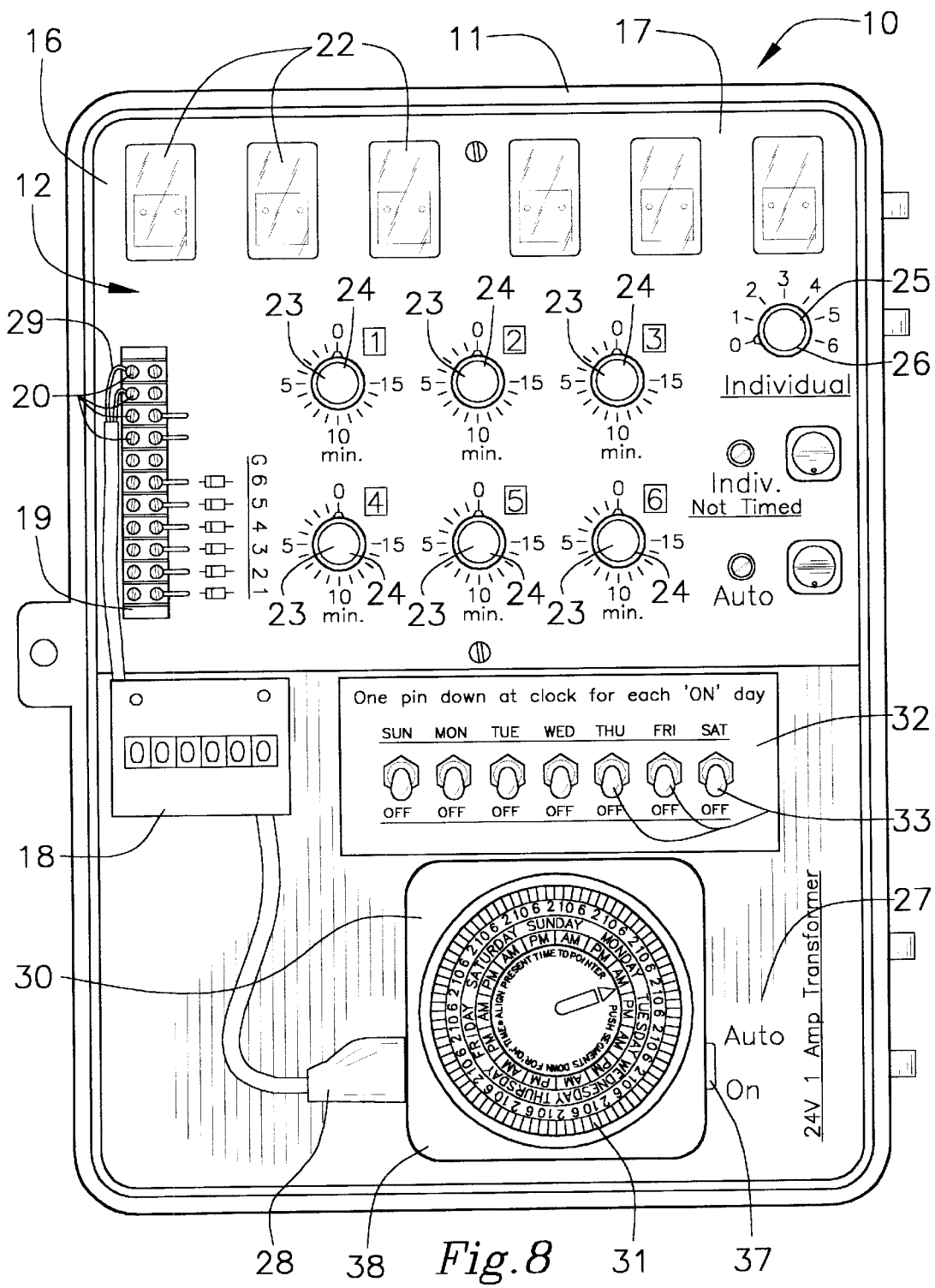
FIG. 8 is a front elevational view of the housing of the present invention showing the inside thereof.
Figure 9:
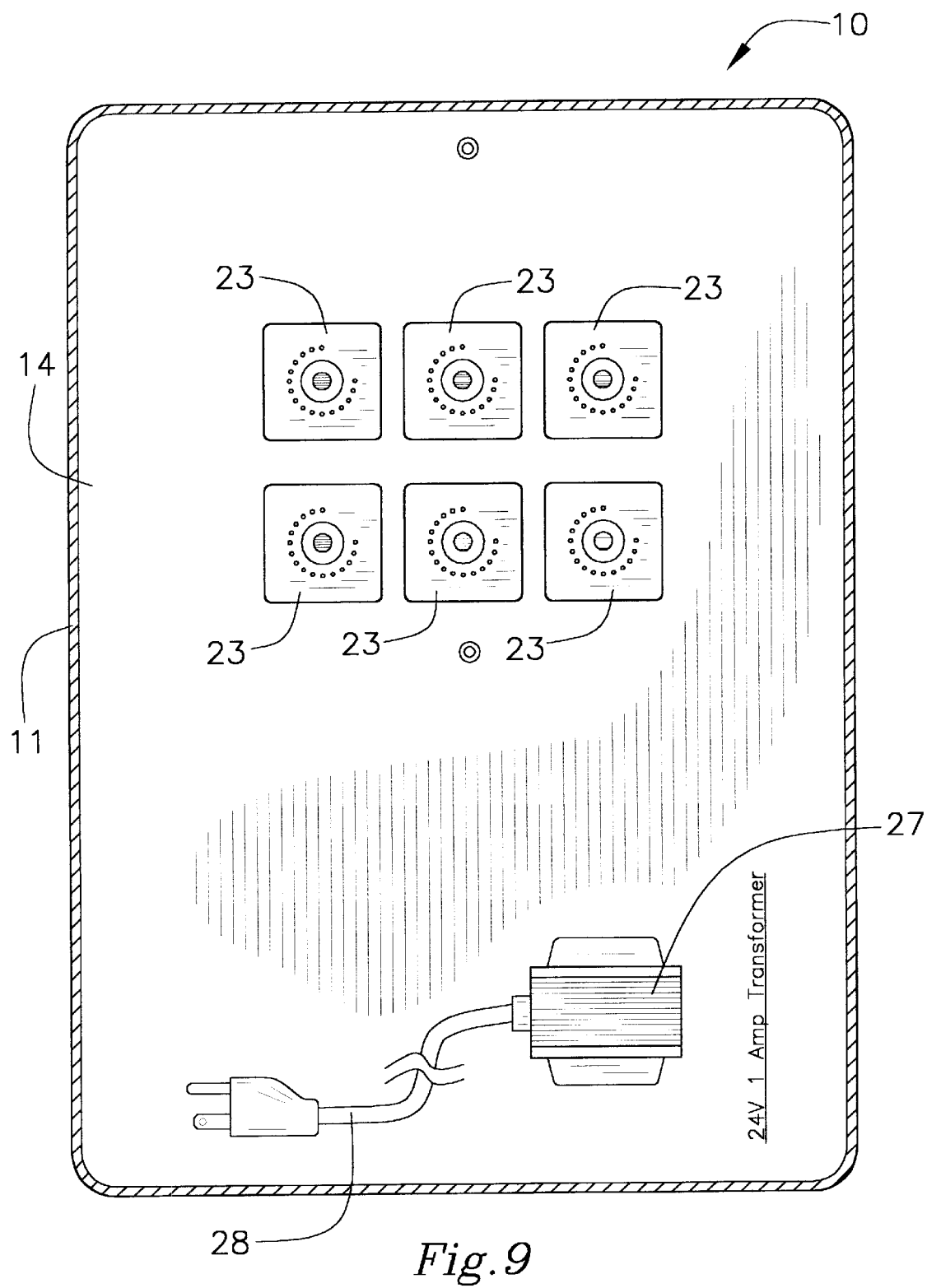
FIG. 9 is a rear elevational view of the housing of the present invention.

With reference now to the drawings, and in particular to FIGS. 1 through 9 thereof, a new sprinkler timer system embodying the principles and concepts of the present invention and generally designated by the reference numeral 10 will be described.

As best illustrated in FIGS. 1 through 9, the sprinkler timer system 10 generally comprises a housing 11 having a back wall 14, side walls 13, and an open front side 12 with the housing 11 being adapted to be mounted to a wall structure. A cover 15 is hingedly attached to the housing 11 and being securely closeable and fastenable over the open front side 12 of the housing 11. A panel 16 is securely and conventionally disposed in the housing 11 and has a front side 17. A plurality of independent water sprinkler circuits 21 are conventionally disposed in the housing 11. Each of the water sprinkler circuits 21 is adapted to control and operate a separate water sprinkler system. Each of the water sprinkler circuits 21 includes time delay relays 22 which are securely and conventionally mounted to the panel 16 and are adapted to be connected to a respective water sprinkler system. Each of the water sprinkler circuits 21 further includes a transistor 34, a diode 35, and a rectifier 36.

A terminal strip 19 has a plurality of terminals 20 securely and conventionally disposed upon the terminal strip 19 with the terminal strip 19 being securely and conventionally mounted to the front side 17 of the panel 16 and being conventionally connected to the water sprinkler circuits 21 with wires 29. A meter 18 is securely and conventionally mounted within the housing 11 for displaying usage of the water sprinkler timer system 10. Means for controlling and energizing the water sprinkler circuits 23 includes a power supply transformer 27 securely and conventionally disposed within the housing 11 below the panel 16 and is connected to a power cord 28 and to the terminal strip 19, and also includes a clock unit 30 being securely and conventionally disposed inside the housing 11 and being connected to the power supply transformer 28 and the meter 18 with wires 29, and further includes a plurality of timer switches 23 securely and conventionally mounted to front side 17 of the panel 16 with each of the timer switches 23 being connected to a respective water sprinkler circuit 21, and also includes an override switch 25 securely and conventionally mounted to the front side 17 of the panel 16 and being connected to the water sprinkler circuits 21 for manually operating each of the water sprinkler circuits 21 independently, and further includes a control on/off switch box 32 being securely and conventionally disposed in the housing 11 and being connected to the clock unit 30 for selecting which days of a week the water sprinkler timer system 10 will operate. The clock unit 30 includes a clock housing 38 and a dial 31 rotatably mounted to the clock housing 38 and being calibrated with all seven days of the week including twenty four hours per day, and also includes a switch member 37 movably and conventionally disposed in a wall of the clock housing 38 for energizing the clock unit 30. Each of the timer switches 23 includes a timer dial member 24 rotatably mounted upon the front side 17 of the panel 16 for selecting an amount of time a respective water sprinkler circuit 21 is to be energized. The timer dial member 24 is calibrated from zero minutes to seventeen minutes. The override switch 25 includes a dial member 26 being rotatably mounted to the front side 17 of the panel 16 for selectively controlling which of the water sprinkler circuits 21 is to be energized. The control on/off switch box 32 includes a plurality of toggle switches 33 movably and conventionally disposed in a wall of the control on/off switch box 32 with each of the toggle switches 33 being identified and corresponded with a particular day of the week and being conventionally connected to the clock unit 30. Each of the timer switches 23 is a potentiometer.

In use, the user sets the timer dial members 24 of the timer switches 23 for the amount of time the particular water sprinkler circuit 21 is to be energized each day, and also sets the dial 31 of the clock unit 30 to which times of the day for each day of the week that the water sprinkler circuits 21 is to be energized, and further sets the particular toggle switches 33 of the control on/off switch box 32 for the particular days of the week the water sprinkler circuits 21 is to be energized. Once energized, the water sprinkler circuits 21 energize the dispensing of water through a water sprinkler system.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sprinkler timer system comprising:
   a housing having a back wall, side walls, and an open front side, said housing being adapted to be mounted to a wall structure;
   a panel disposed in said housing and having a front side;
   a plurality of independent water sprinkler circuits disposed in said housing, each of said water sprinkler circuits being adapted to control and operate a separate water sprinkler system;
   a terminal strip having a plurality of terminals disposed upon said terminal strip, said terminal strip being mounted to said panel;
   a meter mounted on said housing for displaying usage of said water sprinkler timer system; and
   means for controlling and energizing said water sprinkler circuits mounted on said housing and including a clock unit disposed on said housing, a plurality of timer switches with each of said timer switches being connected to a respective said water sprinkler circuit, an override switch connected to said water sprinkler circuits for manually operating each of said water sprinkler circuits independently, a control on/off switch box connected to said clock unit for selecting which days of a week for operation of said water sprinkler timer system.

2. A sprinkler timer system as described in claim 1, wherein each of said water sprinkler circuits includes time delay relays mounted on said panel.

3. A water sprinkler timer system as described in claim 1, wherein said clock unit includes a clock housing and a dial calibrated with all seven days of the week including twenty four hours per day.

4. A water sprinkler timer system as described in claim 1, wherein each of said timer switches includes a timer dial member for selecting an amount of time a respective said water sprinkler circuit will be energized.

5. A water sprinkler timer system as described in claim 1, wherein said override switch includes a dial member for selectively controlling which of said water sprinkler circuits will be energized, also includes a switch member for energizing said clock unit.

6. A water sprinkler timer system as described in claim 1, wherein said control on/off switch box includes a plurality of toggle switches, each of said toggle switches being identified and corresponded with a particular day of the week and being connected to said clock unit.

7. A water sprinkler timer system as described in claim 1, wherein each of said water sprinkler circuits further includes a transistor, a diode, and a rectifier.

8. A water sprinkler timer system as described in claim 1, wherein each of said timer switches is a potentiometer.

9. A sprinkler timer system comprising:
   a housing having a back wall, side walls, and an open front side, said housing being adapted to be mounted to a wall structure;
   a cover being hingedly attached to said housing and being securely closeable over said open front side of said housing;
   a panel disposed in said housing and having a front side;
   a plurality of independent water sprinkler circuits disposed in said housing, each of said water sprinkler circuits being adapted to control and operate a separate water sprinkler system;
   a terminal strip having a plurality of terminals securely disposed upon said terminal strip, said terminal strip being securely mounted to said panel;
   a meter securely mounted within said housing for displaying usage of said water sprinkler timer system; and
   means for controlling and energizing said water sprinkler circuits;
   wherein each of said water sprinkler circuits includes time delay relays which are securely mounted to said panel;
   wherein means for controlling and energizing said water sprinkler timer system includes a power supply transformer securely disposed within said housing and being connected to a power cord and to said terminal strip, and also includes a clock unit securely disposed inside said housing and being connected to said power supply transformer and said meter with wires, and further includes a plurality of timer switches securely mounted to said panel with each of said timer switches being connected to a respective said water sprinkler circuit, and also includes an override switch securely mounted to said panel and being connected to said water sprinkler circuits for manually operating each of said water sprinkler circuits independently, and further includes a control on/off switch box securely disposed within said housing and being connected to said clock unit for selecting which days of a week said water sprinkler timer system would operate.

10. A water sprinkler timer system as described in claim 9, wherein said clock unit includes a clock housing and a dial calibrated with all seven days of the week including twenty four hours per day.

11. A water sprinkler timer system as described in claim 9, wherein each of said timer switches includes a timer dial member for selecting an amount of time a respective said water sprinkler circuit will be energized.

12. A water sprinkler timer system as described in claim 9, wherein said override switch includes a dial member for selectively controlling which of said water sprinkler circuits will be energized, also includes a switch member for energizing said clock unit.

13. A water sprinkler timer system as described in claim 9, wherein said control on/off switch box includes a plurality of toggle switches, each of said toggle switches being identified and corresponded with a particular day of the week and being connected to said clock unit.

14. A water sprinkler timer system as described in claim 9, wherein each of said water sprinkler circuits further includes a transistor, a diode, and a rectifier.

15. A water sprinkler timer system as described in claim 9, wherein each of said timer switches is a potentiometer.

16. A sprinkler timer system comprising:

a housing having a back wall, side walls, and an open front side, said housing being adapted to be mounted to a wall structure;

a cover being hingedly and fastenably attached to said housing and being securely closeable over said open front side of said housing;

a panel disposed in said housing and having a front side;

a plurality of independent water sprinkler circuits disposed in said housing, each of said water sprinkler circuits being adapted to control and operate a separate water sprinkler system, each of said water sprinkler circuits including time delay relays which are securely mounted to said panel, each of said water sprinkler circuits further including a transistor, a diode, and a rectifier;

a terminal strip having a plurality of terminals securely disposed upon said terminal strip, said terminal strip being securely mounted to said panel;

a meter securely mounted within said housing for displaying usage of said water sprinkler timer system; and means for controlling and energizing said water sprinkler circuits including a power supply transformer securely disposed within said housing and being connected to a power cord and to said terminal strip, and also including a clock unit securely disposed inside said housing and being connected to said power supply transformer and said meter with wires, and further including a plurality of timer switches securely mounted to said panel with each of said timer switches being connected to a respective said water sprinkler circuit, and also including an override switch securely mounted to said panel and being connected to said water sprinkler circuits for manually operating each of said water sprinkler circuits independently, and further including a control on/off switch box securely disposed within said housing and being connected to said clock unit for selecting which days of a week said water sprinkler timer system would operate, said clock unit including a clock housing and a dial rotatably mounted to said clock housing and being calibrated with all seven days of the week including twenty four hours per day and also including a switch member movably disposed in a wall of said clock housing for energizing said clock unit, each of said timer switches including a timer dial member rotatably mounted upon said panel for selecting an amount of time a respective said water sprinkler circuit will be energized, said timer dial member being calibrated from zero minutes to seventeen minutes, said override switch including a dial member being rotatably mounted to said panel for selectively controlling which of said water sprinkler circuits will be energized, said control on/off switch box including a plurality of toggle switches movably disposed in a wall of said control on/off switch box, each of said toggle switches being identified and corresponded with a particular day of the week and being connected to said clock unit, each of said timer switches being a potentiometer.

* * * * *